United States Patent
Jensen

(10) Patent No.: US 7,853,267 B2
(45) Date of Patent: Dec. 14, 2010

(54) WIRELESS SYSTEM SIGNAL PROPAGATION COLLECTION AND ANALYSIS

(75) Inventor: Eric Jensen, Herndon, VA (US)

(73) Assignee: Andrew LLC, Hickory, NC (US)

( * ) Notice: Subject to any disclaimer, the term of this patent is extended or adjusted under 35 U.S.C. 154(b) by 1095 days.

(21) Appl. No.: 09/899,128

(22) Filed: Jul. 6, 2001

(65) Prior Publication Data

US 2002/0009992 A1 Jan. 24, 2002

Related U.S. Application Data

(60) Provisional application No. 60/217,171, filed on Jul. 10, 2000.

(51) Int. Cl.
*H04Q 7/20* (2006.01)
(52) U.S. Cl. .............. 455/456.1; 455/456.5; 455/456.6
(58) Field of Classification Search .............. 455/456.1, 455/456.5, 456.6, 404.2, 67.11, 67.14, 423
See application file for complete search history.

(56) References Cited

U.S. PATENT DOCUMENTS

| | | | | |
|---|---|---|---|---|
| 5,095,500 | A * | 3/1992 | Tayloe et al. | 379/32.01 |
| 5,423,067 | A * | 6/1995 | Manabe | 455/524 |
| 6,006,089 | A * | 12/1999 | Sasaki et al. | 455/423 |
| 6,272,337 | B1 * | 8/2001 | Mount et al. | 455/423 |
| 6,400,943 | B1 * | 6/2002 | Montoya | 455/456.5 |
| 6,519,452 | B1 * | 2/2003 | Agostino et al. | 455/423 |
| 6,603,966 | B1 * | 8/2003 | Sheffield | 455/423 |
| 7,280,803 | B2 * | 10/2007 | Nelson | 455/423 |

FOREIGN PATENT DOCUMENTS

JP 05-067996 3/1993

* cited by examiner

*Primary Examiner*—Nay A Maung
*Assistant Examiner*—Angelica M Perez
(74) *Attorney, Agent, or Firm*—Duane Morris, LLP

(57) ABSTRACT

Wireless systems coverage planning uses propagation modeling to provide a prediction of service coverage. Accurate and effective wireless systems coverage analysis requires a measurement of signal strength and knowledge of the location corresponding to the measurement. Wireless signal strength, RSSI, can determined by measuring the signal received by a wireless mobile unit from the cell site antenna or can be determined by measuring the signal received by the antenna from a wireless mobile unit. The received signal strength is compared to the origination signal strength to determine path loss, RSSI. The location of a wireless mobile unit can be determined by a number of different methods. Wireless location systems can be handset-based or network-based. Examples of handset-based wireless location systems include enhanced global positioning systems; enhanced observed time difference; and estimated time of departure. Examples of network-based wireless location systems include estimated time of arrival; time difference of arrival; power level; difference of power level; angle of arrival. Each of these methods rely on the travel of a cellular signal between a mobile unit and at least one cell site. The location of a mobile wireless unit and the strength of the signal received from the mobile wireless unit are utilized to develop a set of measurement data used to evaluate the coverage effectiveness of a wireless system. In addition, these measurements facilitate the enhanced determination of likely service areas, enhanced scoring based upon traffic patterns and the enhanced effective correction of system anomalies.

15 Claims, 3 Drawing Sheets

WIRELESS SYSTEM SIGNAL PROPAGATION COLLECTION AND ANALYSIS

RELATED APPLICATIONS

This application claims the benefit of Provisional Application No. 60/217,171 filed Jul. 10, 2000.

BACKGROUND OF THE INVENTION

The present invention relates to cellular telephone systems and to modeling cellular telephone systems for optimizing utilization of the available overall radio spectrum. More particularly, the present invention relates to a reliable performance prediction based upon a measurement technique for unobtrusive gathering of data about the performance of the cellular system without interruption of normal operation and for complex analysis of the gathered data. The present invention relies upon wireless mobile unit location, geolocation, within a wireless communication system to provide location information and relies upon the measurement of the signal received from a number of mobile units by one or more sites in the system to provide path loss information. The present invention can alternatively rely upon the measurement of the strength of the signal received by the mobile unit. The present invention utilizes system information combined with geolocation and/or signal strength data to determine likely service areas, to establish network scoring, to analyize traffic patterns, blocked call and dropped call patterns and other network management functions.

The service area of a wireless communications system is partitioned into connected service domains known as cells, where radio telephone (cellular) users communicate, via radio links, with the base station serving the cell. The cells can be further partitioned into segments and individual antennae. Wireless systems are designed to provide the most effective coverage of a service area with the most efficient use of system resources, such as towers and antennae. In order to provide effective coverage, antennae tower locations must be carefully planned and antennae installations effectively utilized.

In order to allow mobile units to transmit and receive telephone communications as the units travel over a wide geographic area, each cell is normally physically positioned so that its area of coverage is adjacent to and overlaps the areas of coverage of a number of other cells. When a mobile unit moves from an area covered by one base station to an area covered by another base station, communications with the mobile unit are transferred (handed off) from one base station to another in an area where the coverage from the adjoining cells overlaps. Because of this overlapping coverage, the channels allotted to the individual cells are carefully selected so that adjoining cells do not transmit or receive on the same channels. Signals from all cell sites in an area of overlapping coverage will be received by a mobile wireless unit. Each cell site will also receive the signal from the mobile unit. However, because of the digital codes identifying each channel, the mobile wireless unit can identify the individual signals from individual cell sites. Further, because of the unique identifier associated with each mobile unit, the individual cell sites can identify the mobile unit associated with a given received signal.

When planning and establishing a wireless system, the geographic features of a location are considered as well as availability of antenna locations and likely areas of use. The systems planners use extensive design tools and techniques including practical algorithms for predicting path loss of signal transmission to determine an estimation of the potential coverage of the system once implemented. The system is then established with a set antenna pattern which can and will be adjusted and augmented as the system matures.

After the wireless system is operational, periodic testing is performed on the system to determine the extent and quality of coverage of the antennae in the system. The periodic testing and evaluation can be performed such as described and taught in co-pending application Ser. Nos. 09/567,709 and 09/09/236,572 incorporated herein by reference and in issued U.S. Pat. Nos. 5,926,762 and 5,970,394. Drive testing is a common method for the collection of path loss data within a wireless system. Drive testing collects actual measurements of the signal strength from specific towers received at specific locations throughout the wireless coverage area. One or more mobile receivers are transported throughout a representative portion of the cellular service area. Transportation is commonly accomplished by mounting the receivers in a vehicle and driving a predetermined path through the wireless system. The exact location of each receiver is monitored by means such as global positioning satellite receivers. The signal strength of wireless signals from specific towers in the system is determined by the receivers and correlated to the location of the receiver at the time of reception. The receivers can be tuned to particular frequencies or digital codes to identify the transmitting tower for a particular signal.

In order to develop an accurate representation of the effective coverage of a wireless system, the collected data must indicate both signal strength and location. Location of the collected data is determined by knowledge of the location of the mobile receiver at the time of the signal measurement. In order to optimize the coverage of a wireless system, it is necessary to know the strength of the coverage at a large number of different locations within the system. An accurate representation of the signal coverage can then be projected from interpolation of the path loss data, as fully described in co-pending application Ser. No. 09/567,709 fully incorporated herein by reference.

When data collection is obtained through drive testing a drive plan is established prior to the collection of data. The drive test is a carefully constructed route through a wireless system designed to optimize coverage collection and evaluation. In a first implementation of the present invention, unlike a drive test, data is collected from actual use of the wireless system and therefore the collection route cannot be planned. Data on signal strength is collected by measuring the signal strength of the wireless connection between actual subscribers and the cellular sites. Large amounts of data may be collected from some portions of the wireless system while sparse data may be collected from other portions. In an alternative implementation, data is collected from system use, however, the data is collected from a set of mobile units during a planned drive of the wireless system. In this embodiment, the spread of data is planned. The analysis of data collected through either implementation may be enhanced by the application of interpretation techniques applied to smooth the collected data and fill in gaps in the data.

Several methods for determining the location of a wireless unit within a cell system have been developed and deployed with varying accuracy and success. Wireless location systems can be handset-based in that the hand set acquires information about its position either relative to one or more cell sites or through independent positioning means such as a global positioning satellite system. The mobile unit makes an internal determination of its location and provides this information to the wireless system.

Wireless locations systems can also be network-based wherein the individual cells of the network obtain information about the location of the mobile unit relative to the individual cell sites and the network determines the location of the mobile unit by combining the information from the cell sites to triangulate the location of the mobile unit. For example, the difference in the time of arrival of the signal at each cell site or the difference in the phase angle of arrival at each cell site can be used to determine position.

Geolocation has found widespread application in the field of E-911 and E-411 services offered to cellular communication systems and subscribers. Examples of the application of geolocation of mobile wireless units can be found in the devices of True Position, Grayson Wireless Geometrix, SigmaOne, U.S. Wireless, CellLoc and others.

SUMMARY OF THE INVENTION

The present invention can significantly reduce and or eliminate the need to perform drive testing. The present invention gathers location specific signal strength data by detecting the strength of signals received from mobile units and by using one or more methods for determination of the location of the wireless mobile unit to determine the geographic location corresponding to the signal strength. The mobile units are standard mobile devices, such as cellular phones operated by common system subscribers. However, specialized test units can be used as the mobile unit in the present invention. Instead of drive testing and using mobile signal data collection equipment, as described above, the system of the present invention collects data at the antenna sites. The received signal strength from a plurality of mobile units is collected at the antenna. The location of each mobile unit is determined by one of the location techniques described above. The system then uses signal strength information to determine path loss information on the uplink signal and location information to create a database of reference points from which the system coverage quality can be determined as described below or in any other number of methods.

In order to accurately determine path loss, the uplink signal strength is measured at a point when the transmission power level is known. Transmission power level of mobile units can change over time as a result of negotiations with the cell sites in order to reduce interference with the transmissions from other mobile units in proximity and to optimize transmission power. If the transmit power level of the mobile unit is unknown, an accurate determination of the uplink path loss is not available through implementation of a standard formula. In the event that transmit power is unknown, use of an analytical model is necessary to determine path loss.

The present invention teaches collecting signal strength (path loss) data from operating cellular telephones within the system while simultaneously determining the location of the mobile wireless unit within the system. This provides the same linked data needed to determine system wide propagation form drive testing. The system determines path loss from a combination of the known mobile unit antenna power and the cellular unit power measured at the cell site antenna. In addition, the precise location of the cellular unit at the time of measurement is required. Accurate path loss information correlated to accurate geolocation is critical when optimizing the RF portion of a wireless network.

Examples of handset-based wireless location systems include enhanced global positioning systems and enhanced observed time difference also referred to as estimated time of departure. With enhanced global positioning systems, the mobile unit includes a GPS receiver which determines the location of the mobile unit and transmits the information back to the network, encoded into the network traffic. In enhanced time of departure, the mobile unit determines the time period for travel of a signal from one or more cell towers to the mobile unit. By determining the time of travel, the mobile unit can estimate its distance form one or more cell sites and triangulate its location.

Examples of network-based wireless location systems include estimated time of arrival angle of arrival. Each of these methods rely on assumed propagation models to determine distance based upon the time traveled by a cellular signal between a cell site and a mobile unit.

One geolocation systems is described in U.S. Pat. No. 5,327,144. This patent teaches a cellular telephone location system for automatically recording the location of one or more mobile cellular telephones using three or more cell sites. This patent relies upon a measurement at a number of cell sites of the different arrival times of a signal from a wireless mobile unit. Other representative systems include U.S. Pat. No. 6,011,974 which relies upon the calculation of the time of a round-trip to determine the distance between a mobile unit and a base site using the apparent uplink and down link signal propagation times.

U.S. Pat. Nos. 6,006,096 and 6,052,598 teach that the difference in power levels of an uplink signal from a mobile unit received at a number of cell sites can be used to determine location through triangulation.

The collection of data from mobile units in use in the system can significantly reduce or eliminate the need for drive testing by performing system analysis based upon the enhanced collection of data already existing within the system. Uplink or downlink path loss data can be used to model a system. While drive testing relies upon the collection of downlink data, the present invention can use either downlink or uplink data depending on configuration. The ease of collection of data allows for implementation of updated data collection with minimal planning. Because data can be updated in real time as the system is in use, the implementation of the present invention can allow for dynamic optimization of the wireless system. Dynamic optimization can address system propagation issue on a wider range of scales than system wide periodic optimization.

The implementation of the present invention requires the collection of the necessary information from the wireless system during use. The collection of uplink receive signal strength from a number of mobile units at individual sites and or antennae is necessary as well as the ability to determine the geographic location of each mobile units which can be accomplished through reception at a number of sites in order to determine location of the mobile unit. Because the signal is received at a number of separated sites from the same mobile location, collection and interpretation of the relative signal strengths will enhance the data base and provide greater texture to the resultant wireless service quality analysis.

Once path loss and geographic location have been determined, the evaluation of the performance of the cellular system can be accomplished using any of a number of interpretation techniques, including the geostatistical techniques taught in co-pending patent application Ser. No. 09/567,709 incorporated herein by reference.

These and other features of the invention will be better understood by reference to the detailed description which follows taken together with the drawings in which like elements are referred to by like designations throughout the several views.

The performance, in terms of service evaluation quality, is the goal of the collection and analysis taught herein. The collection of RF propagation data and corresponding location within a wireless system is used to determine performance quality by the analysis of the collected data. The analysis can be used to aid in evaluation of the system, to determine cell placement and channel distribution and to evaluate sector interference. Performance is also directly related to call capacity within a wireless system, improved performance allows for increased call capacity.

The goal of collecting measured data is to obtain as complete a set of measurements at each location as practicable. Complete means that a measurement was achieved for each sector, or it was determined that a sector is below a signal level where either RSSI or geolocation can be detected.

In wireless system planning, certain assumptions are made with regard to the likely service area or the likely service cell site for a particular location within the wireless system. The estimation of likely service area is made based upon the assumption of RF propagation within the geographic features of the wireless system. When planning for drive testing of a wireless system, the receiver apparatus in the drive test vehicles is configured to receive and evaluate signals corresponding to the predetermined likely service areas and network performance evaluation may be made based upon this predetermined likely service area prediction. If the location is actually serviced better by a different site, the evaluation of service will be inaccurate. With the collection method of the present invention, where system performance and evaluation is based upon the analysis of collected actual use data, the predetermination of likely service area does not effect the data because the data collected is from actual service area based upon actual connected mobile units. The use of the present invention which combines geolocation with service data, allows for the determination of measured likely service areas from which can be derived likely service area predictions and likely service area determinations with a greater degree of accuracy.

Further, the data set established by the present invention can be utilized to reassess likely service area designations and to redefine likely service areas based upon the analysis of the collected data. The collected and correlated data can also be used to evaluate traffic usage of the system as well as geographic traffic patterns of the mobile units traveling within the system. The resultant traffic and usage patterns can be used in the system analysis and performance enhancement techniques of the above mentioned co-pending patent applications to improve interference scoring and wireless network system reallocation of resources.

System performance evaluation can also include the collection of drop call and blocked call data by the wireless system. The data is commonly collected as a total number of dropped and blocked calls which can only be used by the system to a limited degree for system assessment. Effective remediation can be enhanced by implementation of the present invention to determine the location of the dropped and/or blocked mobile unit. The combination of drop call and blocked call identification with geolocation data allows for the identification of common areas of dropped and/or blocked calls. Once the area of occurrence is identified, cause may be more readily ascertained and a solution more effectively implemented. The present invention can also be used to identify the geographic area of other system occurrences. The cause of a system difficulty made be more easily identified and addressed when the geographic location of common occurrences of a specific anomaly is identified.

DETAILED DESCRIPTION OF EXEMPLARY EMBODIMENTS

Figure 1:
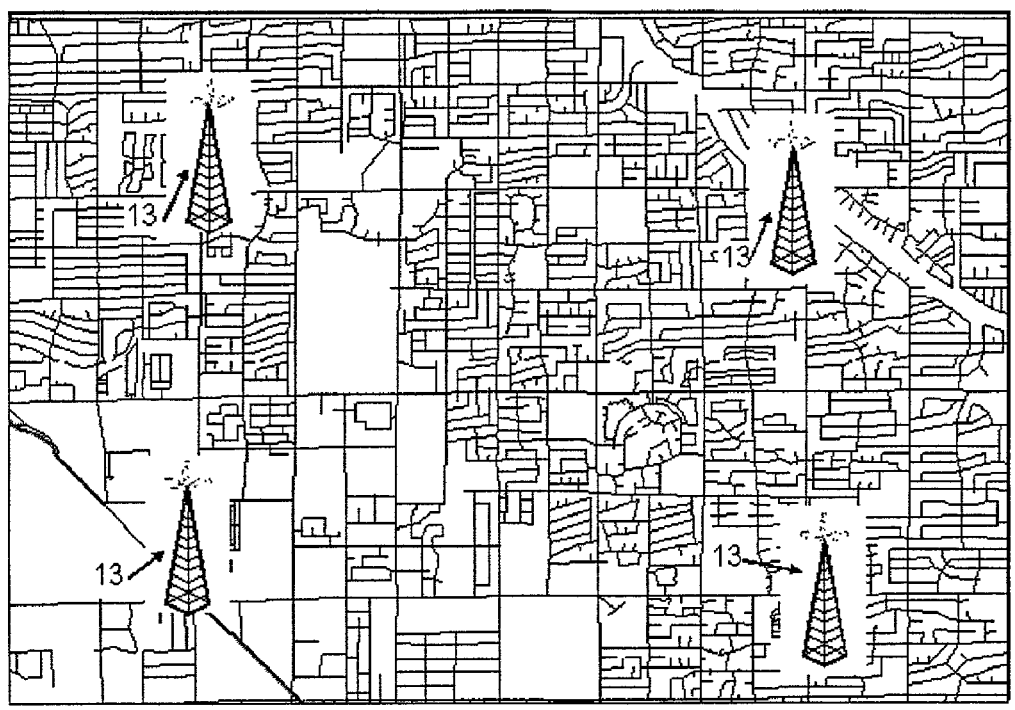
FIG. 1 is an exemplary map of an exemplary wireless system illustrating the location of six cell sites.

FIG. 1 illustrates an exemplary street map of an exemplary portion of an exemplary cellular system. The map of FIG. 1 illustrates the location of a plurality of exemplary cell sites with base stations 13. Each site may be further divided into a number of segments by use of directional antennae. The sites could be divided into any number of segments including a single segment per cell site, three segments per cell site is common. The system may have additional cells (not illustrated) which overlap to provide effective coverage in the region of the cellular system illustrated in FIG. 1, four sites are illustrated for an exemplary embodiment of the present invention.

Figure 2:
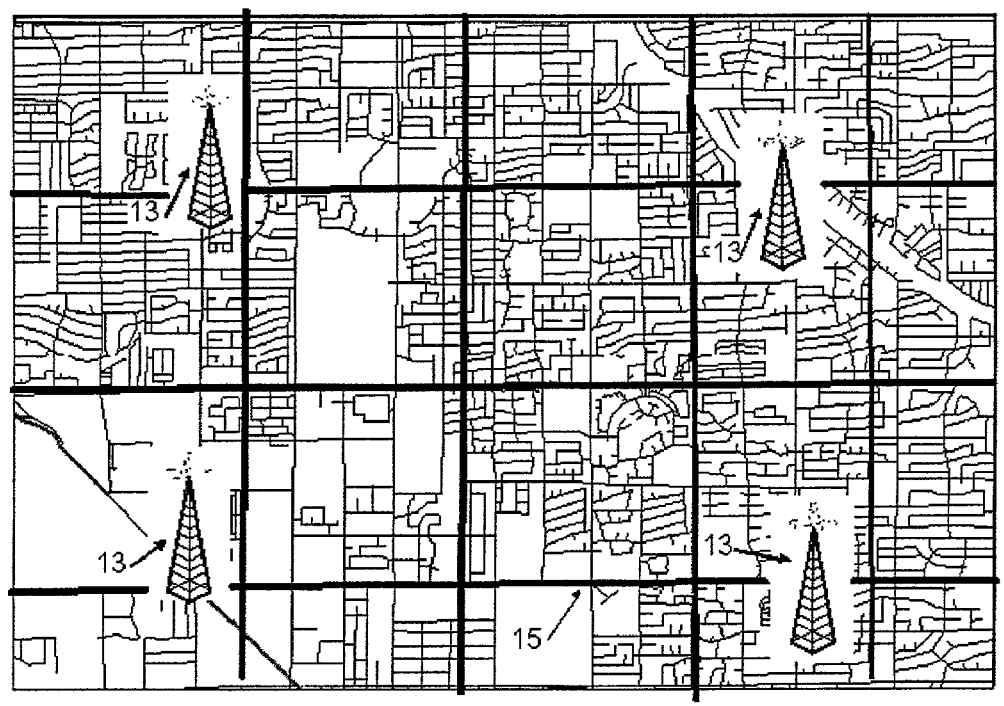
FIG. 2 is an exemplary drive map plan for evaluation of the wireless system of FIG. 1.

FIG. 2 illustrates an exemplary drive test route plan 15 overlayed on the cellular system illustrated in FIG. 1 for the system of cell sites 13. The drive plan 15 is a carefully determined route which will provide maximum efficient coverage of the cellular system. The drive plan 15 is established by evaluation of the distribution of the antennae 13 of the cellular system and through an analysis of the geographical features of the area of the cellular system. The drive test plan may resemble the exemplary test plan 15 or may be more or less extensive dependant upon the determination of the test planner. Typically, a drive test is performed to acquires path loss data corresponding to specific geographic locations within the wireless system.

As detailed in copending applications, a vehicle equipped with appropriate cellular signal receiving and measuring equipment is driven through the cellular system in accordance with the drive test plan map to collect actual signal reception data. A statistically significant number of measurements are taken throughout the cellular system to determine the relative signal strength between each base station 13 and each test location of the mobile unit. The path loss of the signal is measured in dB. As the strength of the received signal decreases, it has a greater path loss or signal loss which is recorded as a greater positive dB number.

Figure 3:
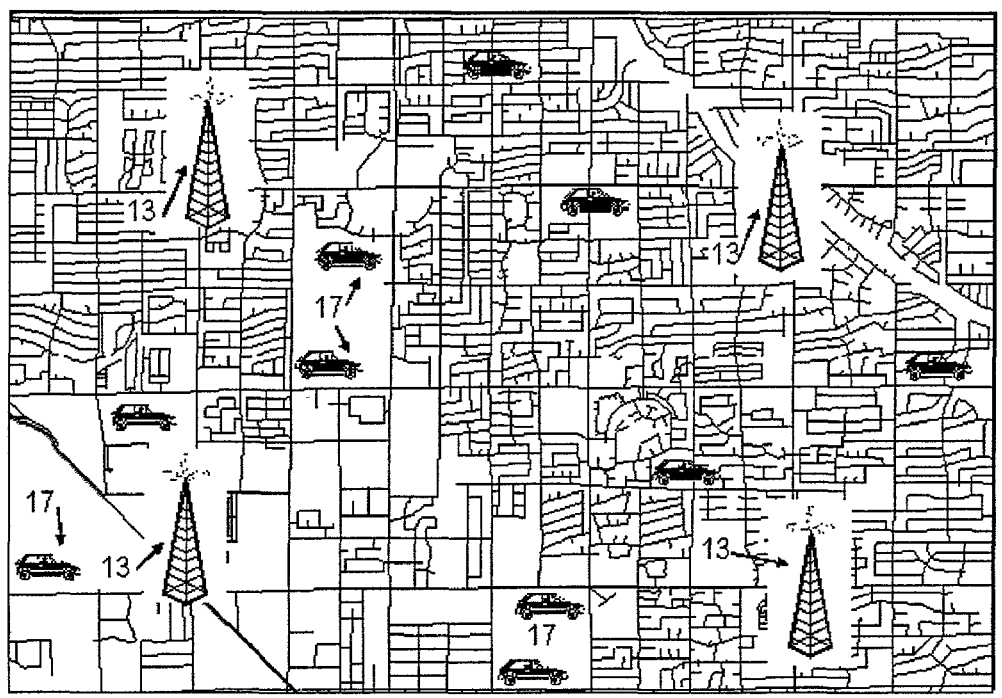
FIG. 3 illustrates a plurality of exemplary wireless unit within the wireless system of FIG. 1.

The present invention does not rely upon drive testing for the collection of path loss data. As illustrated in FIG. 3, during normal operation of the wireless system, a plurality of mobile units 17 (eg. cellular telephones) are operated throughout the system. The antennae on towers 13 are in communication with the mobile units 17 as they move throughout the wireless system. The signal strength RSSI of the uplink signal from each mobile unit 17 is detected by each of the cell sites 13 in communication with the mobile unit 17. The RSSI value is utilized by the wireless system to make determinations for transmission, reception, hand-off, call initiation and other wireless network factors. The RSSI can also be used to determine if the wireless network should exercise control over any of the transmit functions of the wireless unit 17, such as transmit power, through a control channel function.

Figure 5:
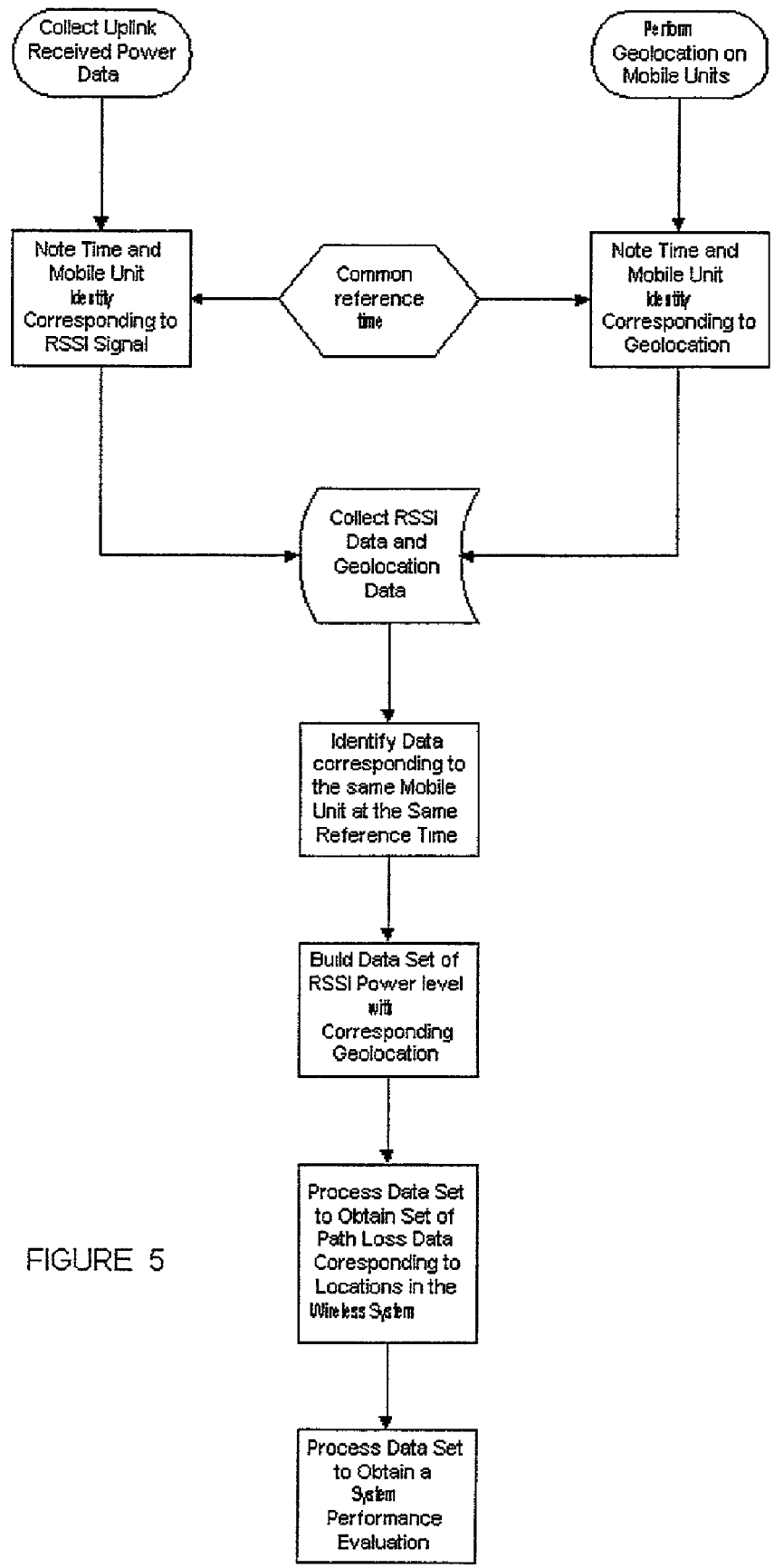
FIG. 5 is a logical flow diagram illustrating the collection of data for evaluation of a wireless system performance.

The present invention, as more fully detailed in FIG. 5, makes further use of the RSSI information in evaluating system performance. Wireless systems utilize RSSI in relation to the individual mobile unit to adjust the units interaction with the wireless system, the present invention teaches retaining the RSSI information of mobile units and correlating that information with the geographic location of the mobile unit to gather information about the performance of the overall wireless system.

Figure 4:
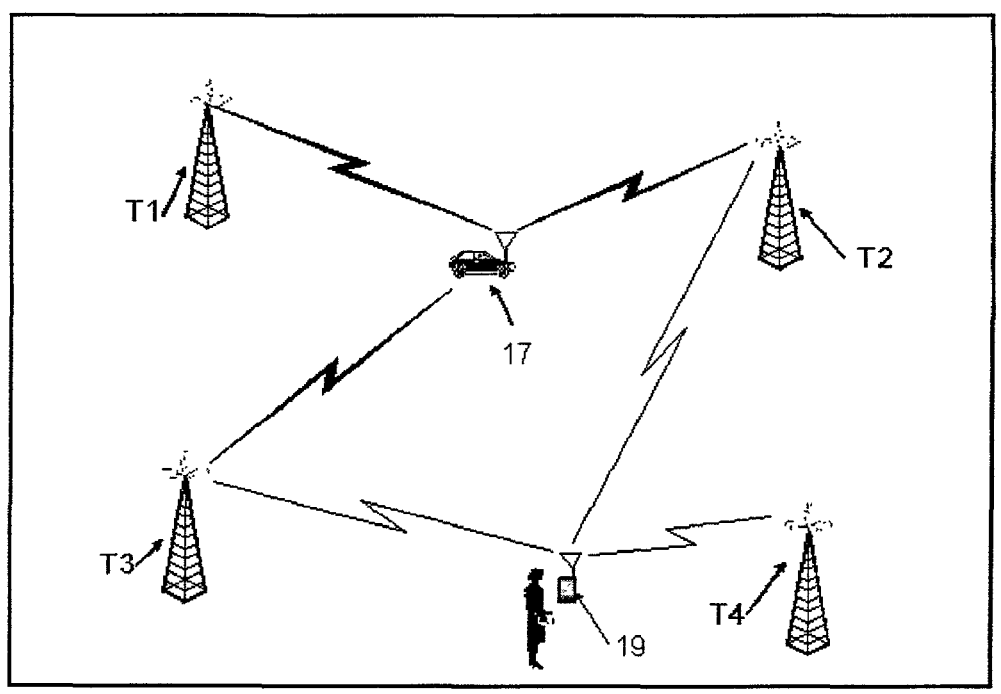
FIG. 4 illustrates one technique for geolocation of an exemplary mobile unit in the exemplary wireless system of FIG. 1.

As described above, there are a number of methods for determination of the geographic location of a mobile unit in a wireless system. An exemplary method is described below with reference to FIG. 4. As illustrated in FIG. 4, the wireless network can determine the location of a mobile unit 17 or 19 through triangulation of that unit with reference to one or more towers in the wireless system. The process of location determination is referred to as geolocation. The signal from mobile unit 17 will be received by towers T1, T2 and T3. The signal will be received first by the closest tower T2, next by tower T1 and last by tower T3. The wireless system will determine the difference in the arrival time at each of the towers and determine the relative distance of the mobile unit 17 from each tower. The wireless system can apply the determined relative distances to triangulate the location of the mobile unit 17. The same procedure can be performed for hand held mobile units 19.

In order to make an accurate determination of geolocation, the uplink signal must be accurately measured and processed and the transmit power of the mobile unit must be known. Many factors relating to the accurate determination of geolocation are found in the prior art and discussed in the references cited above.

In order to implement the present invention, as illustrated in FIG. 5, the information obtained from RSSI measurements and the geolocation data must be correlated and maintained. In one embodiment, the system maintains a reference time which is applied consistently between the RSSI measurement aspects of the wireless system and the geolocation of the wireless system. As the signal strength received form mobile units is detected, the system notes the time of detection of the signal, the strength of the signal at the time of detection and the identity of the transmitting mobile unit. As geolocation data is collected, the system notes the time of collection, the location and identity of the mobile unit. The data is time stamped relative to a common reference time so that the geographic location corresponding to a signal strength measurement can be identified. Correlation of the two data sets requires a common reference time, the real time of collection is not necessary for implementation of the present invention, however, real time collection data can be maintained for other system evaluations such as traffic usage patterns corresponding to diurnal variations.

The geolocation data and signal strength data is compared. The comparison identifies sets of data which correspond to the same mobile unit and determines if any geolocation data has a time stamp in close proximity to the collection of signal strength data relating to the same mobile unit. In order to develop a data set of signal strength correlated to geographic location, the data must be matched for mobile unit identity and time proximity. Depending on the parameters of the implementation of the present invention, the time proximity will have an acceptable range. This range can be determined based upon the average velocity of mobile units within the system, the resolution of the geolocation technique utilized and the location resolution desired by the system performance evaluation.

In an alternative embodiment, if the path loss data and geolocation data are collected in a common data base in real time, by a system capable of matching the data in real time, as it is collected, it may not be necessary to time stamp the data. With real time data matching, only data arriving in close time proximity and attributable to a common mobile unit will be matched to provide signal strength for a given geographic location.

Once data sets of corresponding geolocation and power have been identified, the system creates a data set of points providing path loss data for specific locations within the wireless system. This data is then processed and analyzed to determine system RF propagation performance.

The data set provided by collection of power levels correlated to geolocation of mobile units within the wireless system will provide data points based upon actual system usage. This data collection set has the advantage that a large number of data points will be acquired and the distribution of data points will be highly correlated to the actual system usage patterns. However, unlike drive testing where the coverage of the physical area of the system is planned, the collection of data from actual usage is limited to mobile units which can be geolocated within the system. This collection of data, like drive testing, may not cover all of the area of a cellular system.

Referring to FIG. 5, at step 501 the system collects uplink received power data and notes the time and mobile unit identity corresponding to the RSSI (step 503). Geolocation is performed on mobile units (step 502) and the time and the mobile unit identity corresponding to the geolocation are noted (step 504). Step 505 shows that the results shown in steps 503 and 504 may have a common reference time. As discussed above, the data is stamped relative to a common reference time so that the geographic location corresponding to a signal strength measurement can be identified. At step 506, the RSSI data and geolocation data are collected. At step 507 any data corresponding to the same mobile unit at the same reference time is identified. Based on this information, data set of RSSI power level with corresponding geolocation are built at step 508. Next, at step 509, this data set is processed to obtain a set of path loss data corresponding to location in the wireless system. Finally, at step 510 the date set is processed to obtain a system performance evaluation.

Because cellular planning decisions including site location and channel interference is currently determined based upon this imperfect data set, a reliable and robust method for interpretation of the data set must be used. Co-pending application Ser. No. 09/567,709 teaches a techniques to be applied to test results to make the best determination from available data to estimate needed parameters. Because the distribution of RF signal and channel allocation is complex, even a large data set may not prove sufficient to resolve accurately the actual distribution properties that determine the cellular service quality performance. It is important that an analysis of the data collected be performed to fill in the gaps in a manner which is both accurate and robust. The algorithm for resolving the data into a complete usable data set must also account for the error estimate of particular elements of the data set.

Geostatistical analysis techniques offer a way of describing the spatial continuity that is an essential feature of many natural phenomenon and provide adaptations of classical regression techniques to take advantage of this continuity. In geostatistics, the application of highly developed algorithms modified to the parameters of the provision of cellular service, as taught in the co-pending application yields significantly enhanced results over other data smoothing techniques.

Although the present invention has been described in terms of preferred embodiments, it will be appreciated that various modifications and alterations, might be made by those skilled in the art without departing from the spirit and scope of the invention. The above-described exemplary embodiments are therefore intended to be illustrative, rather than restrictive, of the present invention. Thus the present invention is capable of many variations in detailed implementation that can be derived from the description contained herein. All such variations and modifications are considered to be within the scope and spirit of the present invention as defined by the following claims.

What is claimed is:

1. A method for collecting and processing uplink received signal level data and downlink geolocation data over a wireless system, comprising the steps of:
    gathering signal strength data of received uplink signals of subscriber mobile units as measured and collected by a cell site, the mobile units being in active communication with the cell site and using an active communications channel of the wireless system;
    gathering downlink geolocation data corresponding to the mobile units, the downlink geolocation data measured by the mobile units;
    forming data pairs by identifying the gathered geolocation data and the gathered signal strength data corresponding to the same mobile units and by selecting the geolocation data and the measured signal strength data received within sufficiently close temporal proximity to a reference time stamp to identify data from the same mobile unit;
    generating a set of data pairs correlating measured signal strength values to specific geographic locations throughout said wireless system; and
    analyzing said generated set of data pairs to evaluate system performance within said wireless system,
    wherein each of the steps are performed without drive testing.

2. The method of claim 1, wherein: said signal strength data is collected by measuring the signal strength of a signal received by a cell site, from a mobile wireless unit.

3. The method of claim 1, wherein: said signal strength data is collected by measuring the signal strength of a signal received by a wireless mobile unit, from a cell site.

4. The method of claim 1, where: said signal strength and said geolocation are gathered in real-time at a common data receiver; and said correlation includes matching said geolocation data with said signal strength data of a mobile unit based upon the receipt of data corresponding to the same mobile unit.

5. The method of claim 1, further comprising the step of: analyzing said set of data pairs to evaluate the effective RF propagation within said wireless system.

6. The method of claim 1, further comprising the steps of: identifying the cell site which gathered each signal strength data measurement corresponding to each geolocation within the wireless system; and determining the identified cell site likely to receive a signal from a mobile unit at each identified geolocation within said wireless system.

7. The method of claim 6, further comprising the step of: redefining the projected distribution of likely server cell sites within said wireless system based upon the determination of identified likely cell sites.

8. The method of claim 1, further comprising the steps of: gathering drop call incident data from said system; and identifying the geolocation corresponding to said dropped call incidents.

9. The method of claim 8, further comprising the step of: generating a set of data points correlating drop call incidents with geolocation of occurrence.

10. The method of claim 9, further comprising the step of: analyzing said drop call geolocation data set to determine an effective implementation for addressing dropped calls.

11. The method of claim 1, further comprising the steps of: gathering blocked call incident data from said system; and identifying the geolocation corresponding to said blocked call incidents.

12. The method of claim 11, further comprising the step of: generating a set of data points correlating blocked call incidents with geolocation of occurrence.

13. The method of claim 12, further comprising the step of: analyzing said blocked call geolocation data set to determine an effective implementation for addressing blocked calls.

14. A method for collecting and processing uplink received signal level data and downlink geolocation data over a wireless system, comprising the steps of:
    gathering signal strength data of received uplink signals of subscriber mobile units as measured and collected by a cell site, the mobile units being in active communication with the cell site and using an active communications channel of the wireless system;
    gathering downlink geolocation data corresponding to the mobile units, the downlink geolocation data being measured by the mobile units;
    time stamping said gathered signal strength data and said gathered geolocation data with reference to a common reference time;
    identifying geolocation data and signal strength data corresponding to a common mobile unit and gathered within a predetermined time proximity to a common time reference to identify the geolocation of another mobile unit and the specific signal strength gathered from the another mobile unit at said identified geolocation;
    generating a set of data correlating signal strength values to geographic locations within said wireless system; and
    analyzing said generated set of data pairs to evaluate system performance within said wireless system,
    wherein each of the steps are performed without drive testing.

15. Apparatus for collecting and processing uplink received signal level data and downlink geolocation data over a wireless system, comprising:
    RF signal measurement equipment at a cell site for measuring and receiving uplink signal strength data of subscriber mobile units in active communication with the cell site using an active communications channel of the wireless system;
    geolocation equipment for determining downlink geolocation data corresponding to the mobile units, the downlink geolocation data being measured by the mobile units;
    a reference time generator for time stamping the gathered signal strength data and the gathered geolocation data with reference to a common reference time;
    storage for combining said signal strength data and said geolocation data;

a processor for identifying signal strength data elements corresponding to geolocation data elements and for generating a set of data pairs correlating signal strength values to geographic locations within said wireless system corresponding to the same mobile unit; and a processor for analyzing said generated set of data pairs to evaluate system performance within said wireless system, wherein the processor identifies signal strength data elements corresponding to geolocation data elements by selecting the geolocation data and the measured signal strength data received within sufficiently close temporal proximity to a reference time stamp to identify data from the same mobile unit, and wherein each of said equipment, generator, storage and processor are non-mobile signal data collection equipment.

* * * * *